(12) United States Patent
Gregor et al.

(10) Patent No.: US 8,474,421 B2
(45) Date of Patent: Jul. 2, 2013

(54) VALVE TRAIN DEVICE

(75) Inventors: Matthias Gregor, Stuttgart (DE);
Richard Jakobi, Winnenden (DE)

(73) Assignee: Daimler AG, Stuttgart (DE)

( * ) Notice: Subject to any disclaimer, the term of this patent is extended or adjusted under 35 U.S.C. 154(b) by 379 days.

(21) Appl. No.: 12/927,120

(22) Filed: Nov. 5, 2010

(65) Prior Publication Data
US 2011/0088643 A1   Apr. 21, 2011

Related U.S. Application Data

(63) Continuation-in-part of application No. PCT/EP2009/002290, filed on Mar. 28, 2009.

(30) Foreign Application Priority Data

May 17, 2008   (DE) .......................... 10 2008 024 086

(51) Int. Cl.
*F01L 9/04*   (2006.01)
(52) U.S. Cl.
USPC ................... 123/90.11; 123/90.15; 123/90.16; 123/90.17
(58) Field of Classification Search
USPC ...................... 123/90.15, 90.17, 90.16, 90.11
See application file for complete search history.

(56) References Cited

U.S. PATENT DOCUMENTS

| | | | | |
|---|---|---|---|---|
| 4,510,903 A | * | 4/1985 | Sakakiyama | ............... 290/40 B |
| 2007/0034184 A1 | * | 2/2007 | Dengler | ..................... 123/90.17 |

FOREIGN PATENT DOCUMENTS

| | | |
|---|---|---|
| CN | 1169538 | 1/1998 |
| CN | 1360137 | 7/2002 |
| JP | 2001 159505 | 6/2001 |
| WO | WO 01/20140 | 3/2001 |
| WO | WO 2007/013874 | 2/2004 |
| WO | WO 2007/090532 | 8/2007 |

* cited by examiner

*Primary Examiner* — Zelalem Eshete
(74) *Attorney, Agent, or Firm* — Klaus J. Bach

(57) ABSTRACT

In a valve drive train device, in particular for a valve drive of an internal combustion engine, with a switching unit comprising an actuator with a solenoid unit and with a control unit for monitoring switching operations of the switching unit provided for switching an axially displaceable cam element by means of a switch gate, the control unit for monitoring the switching unit is taking into account at least one characteristic value of a voltage integral over a voltage which is induced in a coil of the switching unit during the switching operation and is adjusting the value with respect to a characteristic limit value stored in the control unit.

11 Claims, 4 Drawing Sheets

VALVE TRAIN DEVICE

This is a Continuation-In-Part Application of pending international patent application PCT/ep2009/002290 filed Mar. 28, 2009 and claiming the priority of German patent application 10 2008 024 086.9 filed May 17, 2008.

BACKGROUND OF THE INVENTION

The invention relates to a valve train device for an internal combustion engine including a control unit for monitoring the operation of a shifting unit for axially shifting a cam element by means of a shift gate.

From DE 10 2004 030 779 A1, a valve train device, in particular for an internal combustion engine, is known, which comprises a control unit provided for monitoring a switching operation of a switching unit designed for switching an axially displaceable cam element by means of a shift gate.

It is the principal object of the invention to reduce a vulnerability to faults in the process of monitoring the shifting operation.

SUMMARY OF THE INVENTION

In a valve drive train device, in particular for a valve drive of an internal combustion engine, with a switching unit comprising an actuator with a solenoid unit and with a control unit for monitoring switching operations of the switching unit provided for switching an axially displaceable cam element by means of a switch gate, the control unit for monitoring the switching unit is taking into account at least one characteristic value of a voltage integral over a voltage which is induced in a coil of the switching unit during the switching operation and is adjusting the value with respect to a characteristic limit value stored in the control unit.

As a result of the development according to the invention, the monitoring of the switching operating by the control unit becomes independent of an individual voltage value, whereby an error-proneness of the monitoring process can be reduced. In particular, the monitoring by evaluation of the characteristic value for the voltage integral may depend only on an initial state and a final state and is independent of its progress between the initial state and the final state, resulting in a particular low error-proneness, for example with respect to pulse spikes. The term "control unit" should in particular be understood to mean a processor unit with a memory unit and an operating program stored in the memory unit.

The term "provided" should in particular be understood to mean specially designed, configured and/or programmed. A "voltage integral" should in particular be understood to mean an integral across a voltage which is generated by the switching unit during a switching operation. The term "monitoring a switching operation" should in particular be understood to mean that a switching operation is monitored for faultless execution. The control unit is provided to monitor a switching operation in which a switching pin is moved from a switching position in which the switching pin is extended into a base position in which the switching pin is retracted.

The term "characteristic value" should further be understood to mean a variable which can be determined by the control unit and on which a value of the voltage integral depends directly or indirectly, for example, a charge amount determined by means of a capacitor or characteristic value calculated from a voltage curve. The characteristic value may in particular be determined by approximation, for example by a mathematical approximation of the voltage integral by means of a summation. The term "monitoring of the switching unit" should in particular be understood to mean that the switching unit is monitored by means of the control unit for unexpected switching operations, such as an unintentional extension or retraction.

It is further proposed that the control unit should be capable of adding at least two voltage values separated by time for the forming the characteristic value. By means of adding at least two values, the characteristic value for the voltage integral can be determined in a particularly simple way. In principle, it is possible to calculate the characteristic value by means of addition only. It is however also possible to combine this addition with a multiplication, for example, in order to weight individual additional terms.

A number of voltage values which are summed is preferably significantly more than two, because accuracy increases with the number of voltage values. The term "voltage value" should in this context in particular be understood to mean a parameter which corresponds to a voltage generated by the switching unit at a defined point in time.

The control unit is preferably provided for evaluating a defined interval. This permits the determination of an end time. The term "defined interval" should be understood to mean an interval the end point of which is at a fixed distance from the start.

It is in particular advantageous if an interval length is time-dependent. In this way, an unnecessarily long determination which may for example contain errors caused by a subsequent switching operation can be avoided.

It is also advantageous if the interval has an angle-dependent interval length. In this way, the interval length can be matched advantageously to the design of the switch gate. In principle, the interval length may be time and angle-dependent, for example like an interval which covers a predefined angle range and a predefined period of time, which may for example follow after the angle range.

In an advantageous further development of the invention, the control unit is provided for setting the characteristic value with respect to a characteristic limit value which is independent of a switching speed. There is then no need for a complex determination of the characteristic limit value. The term "characteristic limit value" which is independent of a switching speed should in particular be understood to mean a characteristic limit value which is independent of a speed of the cam element and/or independent of a lubricant temperature. The switching speed depends in particular on rotary speed and lubricant temperature.

In a further development of the invention, it is provided that the control unit should comprise at least one integrator circuit. In this context, the term "integrator circuit" should in particular be understood to mean a circuit by means of which the characteristic value can be determined on the hardware side, for example, a circuit with a capacitor which is charged and thereby provides the characteristic value. Such a design permits the use of a control unit with a particularly simple software.

The invention will become more readily apparent from the following description of a particular embodiment thereof with reference to the accompanying drawings. The drawings show two embodiments of the invention. The drawings, the description and the claims contain numerous features in combination.

DESCRIPTION OF PARTICULAR EMBODIMENTS

Figure 1:
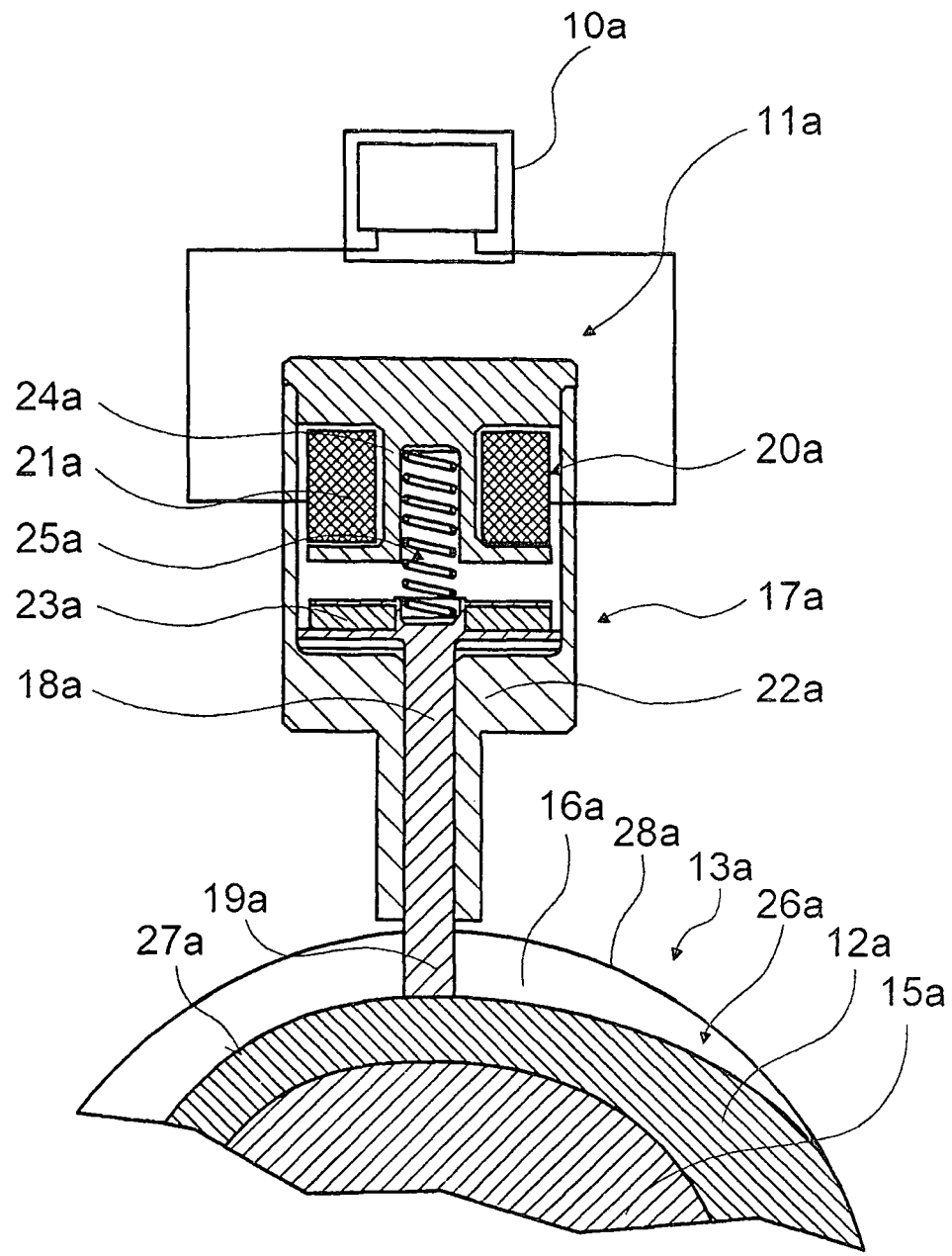
FIG. 1 shows a valve train device with a switching unit and a control unit.

FIG. 1 shows a control device for a valve train of an internal combustion engine. The valve train control device comprises a cam element 12a located non-rotatably but axially movably with respect to a camshaft 15a. The cam element 12a is displaced by means of a switching unit 11a and a shift gate 13a. The shift gate 13a has a gate track 16a in the form of a groove.

The switching unit 11a comprises an actuator 17a and a switching element 18a. The switching element 18a is in the form of a switching pin 19a which is extended in a switching position of the switching element 18a. In the switching position, the switching pin 19a engages the gate track 16a of the shift gate 13a.

The actuator 17a which moves the switching element 18a, comprises a solenoid unit 20a. The solenoid unit 20a comprises a coil 21a located in a stator 22a of the solenoid unit. The coil 21a can generate a magnetic field which interacts with a permanent magnet 23a located in the switching element 18a. In this way, the switching pin 19a can be extended with the switching element 18a. A core 24a amplifies the magnetic field generated by the solenoid unit 20a.

If the coil 21a is de-energized, the permanent magnet 23a interacts with the surrounding material. In the neutral position, the permanent magnet 23a interacts in particular with the core 24a of the solenoid unit 20a, which is made of a magnetic material. In the switching position, the permanent magnet 23a interacts with the stator 22a of the actuator 17a. In a de-energized operating state, the permanent magnet 23a stabilizes the switching element 18a in the switching position or in the neutral position. The switching unit 11a is therefore designed as a bi-stable system biased towards the switching position or the neutral position when de-energized.

In an energized operating state of the solenoid unit 20a, the permanent magnet 23a interacts with the field of the solenoid unit 20a. Depending on a polarization of the permanent magnet 23a and the solenoid unit 20a, a force of attraction or repulsion can be generated. A polarization of the solenoid unit 20a can be changed by means of a direction in which current is applied to the solenoid unit 20a. In order to extend the switching element 18a from its neutral position to the switching position, current is applied to the solenoid unit 20a in the direction in which a force of repulsion is generated between the solenoid unit 20a and the permanent magnet 23a.

The actuator 17a further comprises a spring unit 25a which also applies a force to the switching element 18a. The force of the spring unit 25a is oriented in a direction which corresponds to a direction of the force of repulsion between the solenoid unit 20a and the permanent magnet 23a, whereby the extension of the switching element 18a is accelerated.

The gate track 16a has an axial directional component. If the switching element 18a is in the switching position, the axial directional component applies a force to the cam element 12a during a rotational movement of the cam element 12a, whereby the cam element 12a is displaced. In order to move the switching element 18a into its neutral position following a displacement of the cam element 12a, the gate track 16a has a disengaging segment 26a in which a groove bottom 27a rises to a base circle level 28a. The disengaging segment 26a applies a force to the switching element 18a which moves the switching element 18a back.

In a retraction switching operation, in which the switching element is moved from its switching position into neutral position by means of the disengaging segment 26a, the switching element 18a is in a first phase 29a biased towards the switching position by an interaction between the permanent magnet 23a and the stator 22a. By the disengaging segment 26a and the rotary movement of the cam element 12a, the switching element 18a is moved towards its neutral position. By the disengaging segment 26a, the switching element 18a is moved against the force generated by the interaction between the permanent magnet 23a and the stator 22a.

In a second phase 30a, the switching element 18a separates from the groove bottom 27a and is biased towards the neutral position by the interaction of the permanent magnet 23a and the core 24a. By this interaction of the permanent magnet 23a and the core 24a, the switching element 18a is moved into its neutral position irrespective of the rotational movement of the cam element 12a.

In the retraction switching operation, in which the solenoid unit 20a is de-energized, a voltage 31a is induced in the coil 21a by the movement of the permanent magnet 23a. The induced voltage 31a is evaluated by means of a control unit 10a. The control unit 10a monitors the retraction switching operation in particular for a faultless switching operation and to determine whether the switching element 18a is switched from the switching position into the neutral position.

In monitoring the retraction switching operation, the control unit 10a takes account of a characteristic value for a voltage integral 14a. The voltage integral 14a is based on the voltage 31a which is induced in the coil 21a by the switching operation and which is therefore generated by the switching unit 11a.

A value of the voltage integral 14a solely depends on a stroke 23a of the switching element 18a at the start and at the end of the determination. For a measurement across a sufficiently long interval, the value of the voltage integral 14a is independent of parameters of the switching operation, such as a switching speed 33a at which the switching element is moved.

In order to determine the characteristic value for the voltage integral 14a, the control unit 10a determines chronologically consecutive values of the voltage induced in the coil 13a. The characteristic value is based on an addition of the chronologically consecutive voltage values.

In a first operating mode, the control unit 10a determines the characteristic value in a time-dependent manner. The voltage values are determined at predefined, constant time intervals. Two voltage values are determined in intervals of approximately 10 milliseconds. For the determination of the characteristic value, it is therefore sufficient just to add the voltage values. In principle, however, it would also be conceivable to define the time intervals in dependence on a parameter and to weight each voltage value with a factor.

The control unit 10a evaluates a defined interval. This interval has a length which corresponds to an expected length of the switching operation. This length is predefined by the control unit 10a and may depend on further parameters.

Figure 2:
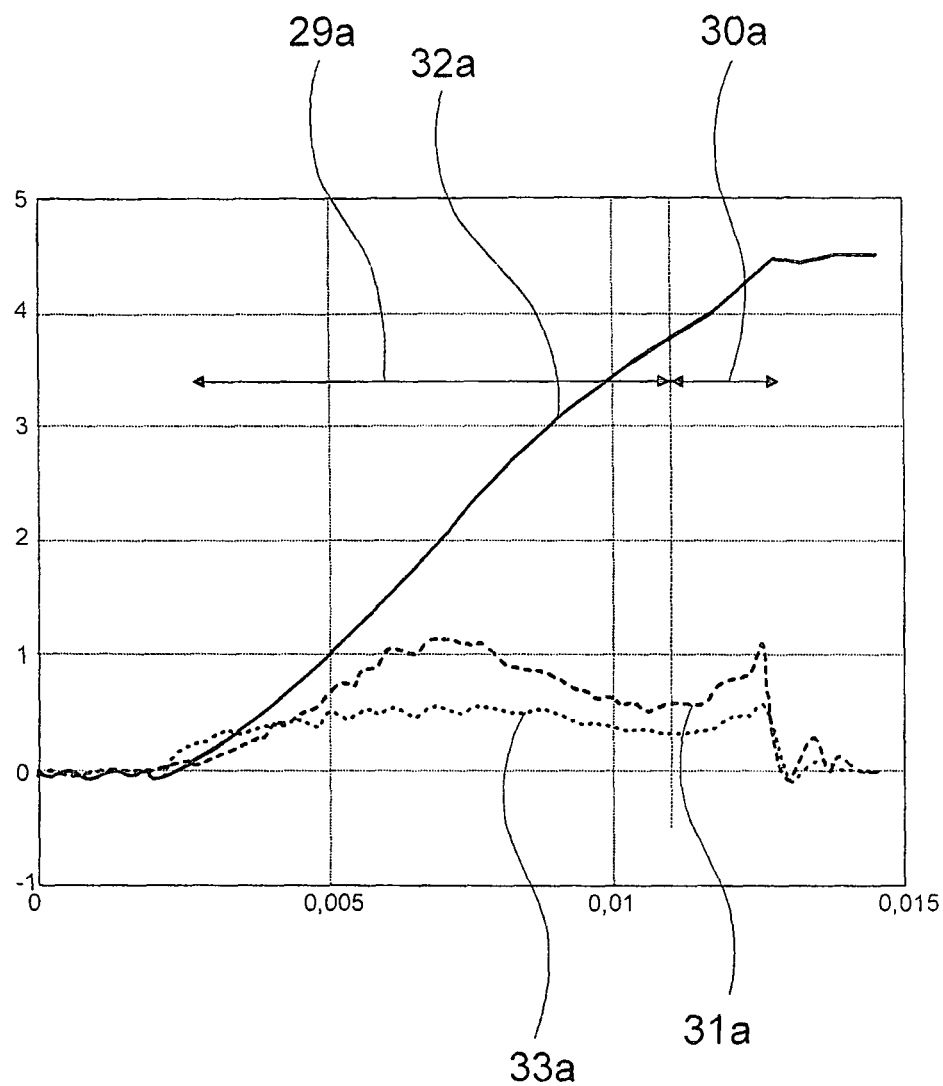
FIG. 2 shows a diagram illustrating the behavior of the switching unit and a voltage generated by the switching unit in dependence on time.

A characteristic value at the end of the interval is independent of a switching speed 33a with which the switching element 18a is switched from its switching position into its neutral position. In particular in the first phase 29a, in which the switching element 18a moves through the groove bottom 27a, the switching speed 33a is determined by a speed of the cam element 12a. In the second phase 30a, in which the switching element is moved by the interaction of the permanent magnet 23a, the switching speed 33a and thus the voltage 31a are independent of the speed of the camshaft. In the second phase 30a, the switching speed 33a solely depends on the parameters of the switching unit 11a, in particular on a lubricant temperature of the switching unit (cf. FIG. 2). In a time-dependent determination process, the characteristic value is independent of the speed of the cam element 12a.

In order to detect a faultless switching operation, a characteristic limit value to which the characteristic value is referred is stored in the control unit 10a. The retraction switching operation is faultless if the characteristic value exceeds the characteristic limit value. In this context, the characteristic limit value is independent of an expected switching speed of the switching element, which is in particular determined by the speed of the camshaft and by the lubricant temperature.

In a second operating mode, the control unit 10a determines the characteristic value in an angle-dependent manner. In contrast to the first operating mode, the control unit 10a in this mode adds voltage values which are determined in dependence on a rotary position of the cam element 12a. In this case, the control unit 10a uses an existing sensor device not shown in the drawing.

As this method of determination provides a characteristic value which depends on the speed of the cam element 12a, a speed-dependent value can be obtained by dividing the characteristic value by the speed value. There is no complex interrelation which would have to be determined in a complicated process.

Figure 3:
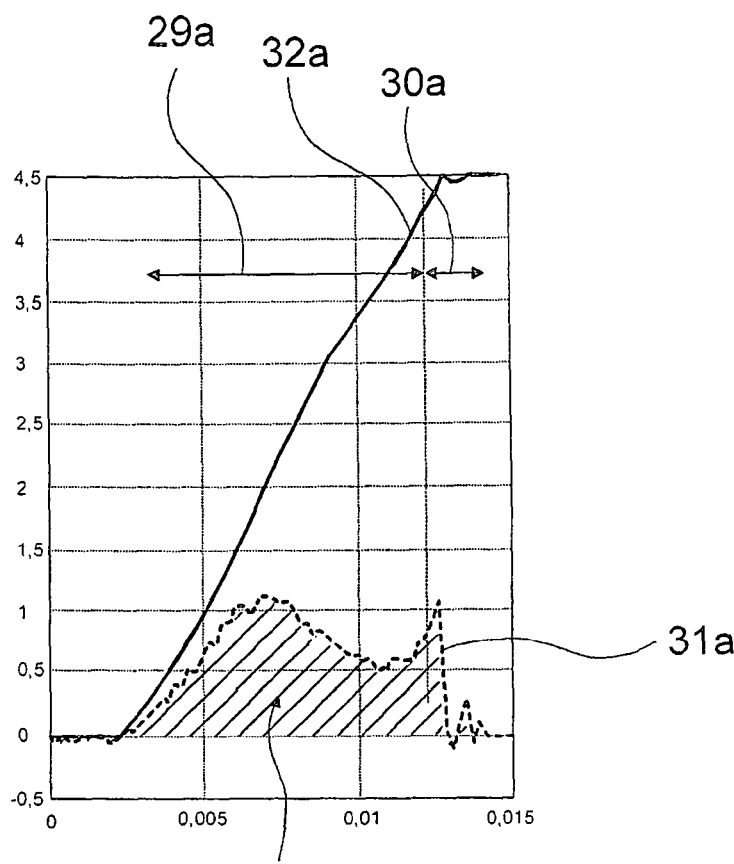
FIG. 3 shows a diagram of the voltage generated by the switching unit in dependence on time for a first speed.
Figure 4:
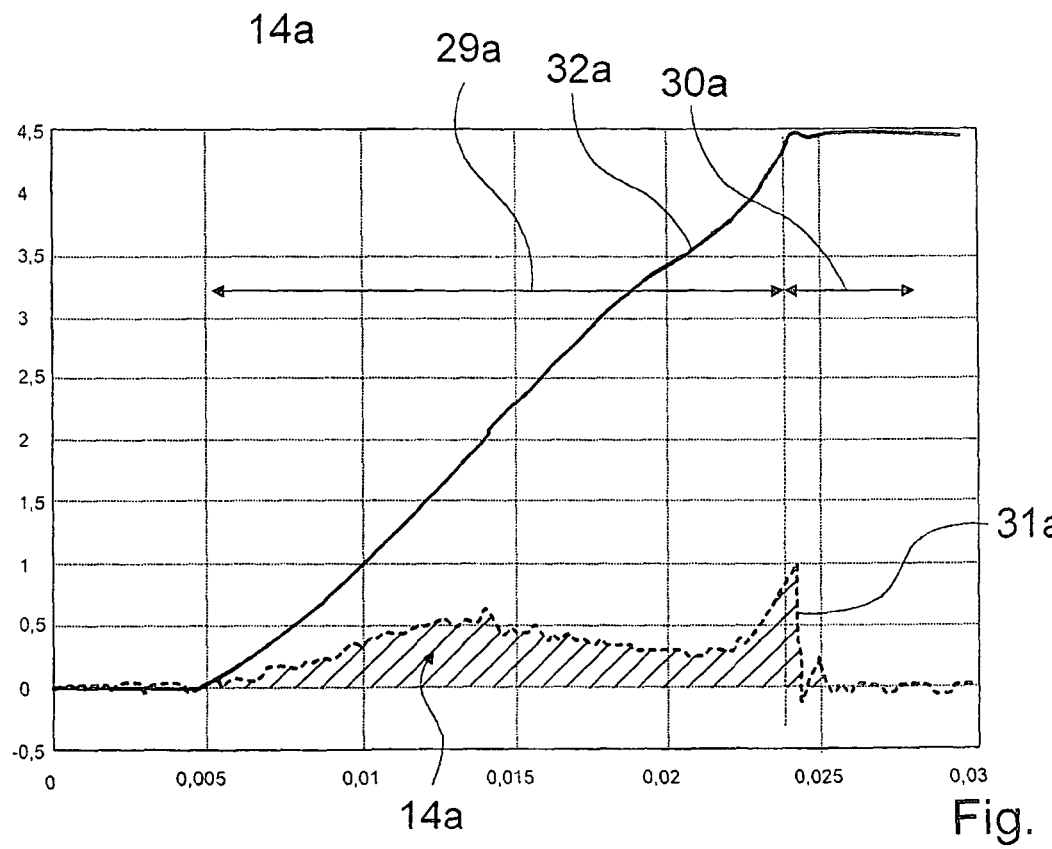
FIG. 4 shows a diagram of the voltage generated by the switching unit in dependence on time for a second speed.

The first operating mode is chosen if the speed of the cam element 12a exceeds a limit speed (cf. FIG. 3). The time interval between two consecutive voltage values corresponds to an operating time which the control unit 10a requires for the determination of the voltage value. The second operating mode is chosen if the speed of the cam element 12a is less than the limit speed (cf. FIG. 4).

The control unit 10a is further provided for monitoring the switching unit 11a in the de-energized state of the solenoid unit 20a. The switching unit 11a is in particular monitored while the switching element 18a is in the switching position and it is in principle possible that the switching element 18a might perform an unexpected retraction switching operation.

Figure 5:
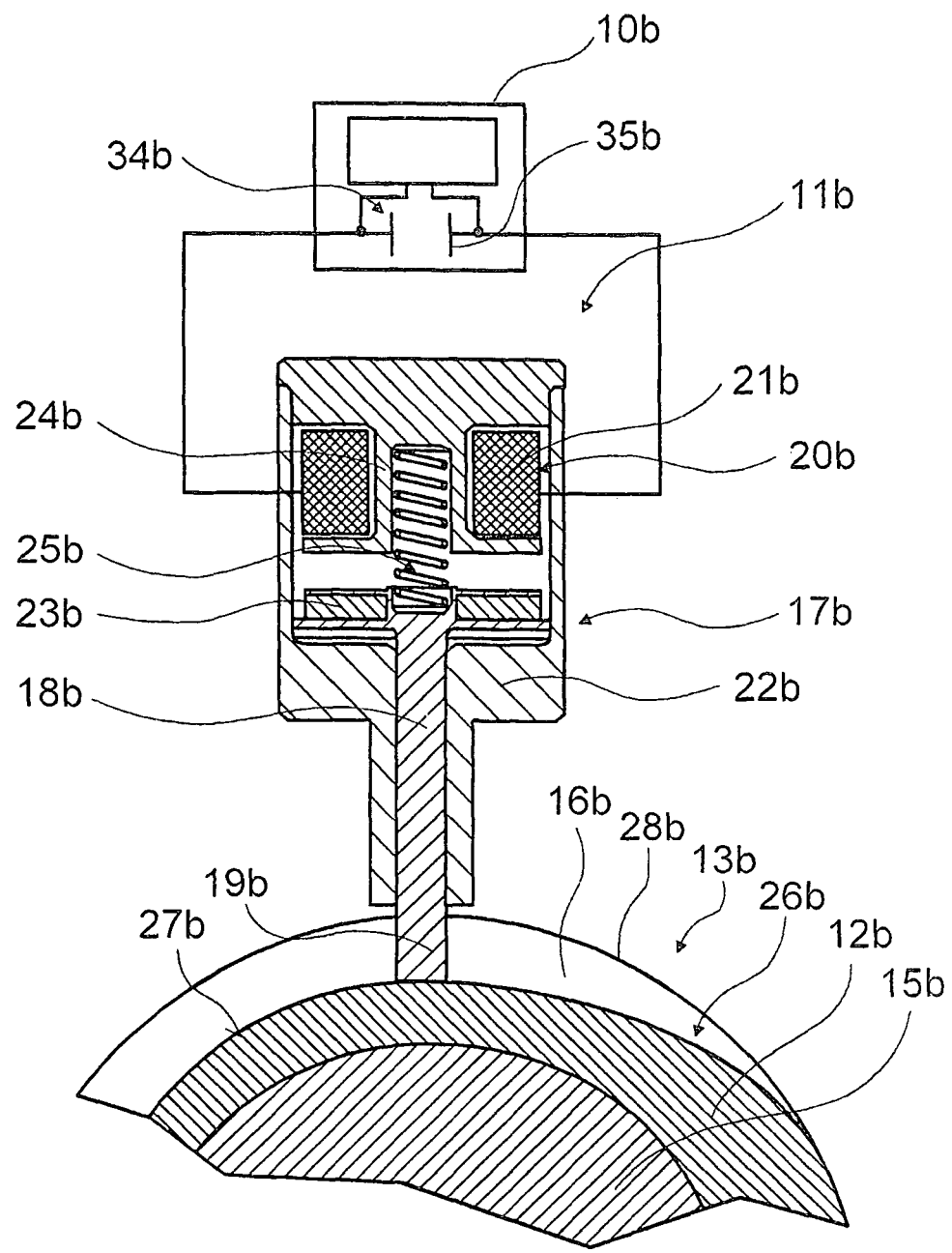
FIG. 5 shows a valve train device with a switching unit and an alternative control unit.

FIG. 5 shows a further embodiment of the invention. To distinguish it from the embodiment described above, the letter a in the reference numbers of the embodiment in FIGS. 1 to 4 has been replaced by the letter b in the reference numbers of the embodiment in FIG. 5. The following description is essentially limited to differences from the embodiment in FIGS. 1 to 4, and for identical components, features and function, reference should be made to the embodiment shown in FIGS. 1 to 4.

FIG. 5 is a diagrammatic representation of an alternative embodiment of the valve train device. The valve train device comprises a control unit 10b with an integrator circuit 34b. The integrator circuit 34b is based on a capacitor 35b connected to a coil 21b of a solenoid unit 20b. The control unit 10b is provided for determining a voltage value of the capacitor 35b.

In a switching operation of a switching element 18b of a switching unit, in which a voltage is induced in the coil 21b of the de-energized solenoid unit 20b, the capacitor 35b is charged. A number of charges flowing to the capacitor 35b forms a voltage integral 14b across the induced voltage. The voltage value of the capacitor 35b, which can be determined by means of the control unit 10b, is proportional to the number of charges. In this way, the voltage value forms a direct characteristic value by means of which the voltage integral can be determined.

Conceivable in principle, but not shown in FIG. 5 is a further circuit which is provided for supplementing and/or improving the integrator circuit 34b. It would for example be conceivable to supplement the integrator circuit 34b with an amplifier circuit which amplifies the induced voltage and thus reduces any inaccuracies caused by the capacitor 35b.

What is claimed is:

1. A valve train device for an internal combustion engine, with a switching unit (11a, 11b) comprising an electric actuator (17a, 17b) with a solenoid unit (20a, 20b) including a coil (21a, 21b) and with a control unit (10a, 10b) for monitoring a switching operation of the switching unit (11a, 11b) by a switching element (18a) of the electric actuator (17a, 17b) engaging and switching an axially displaceable cam element (12a, 12b) by means of a shift gate (13a, 13b) formed in the axially displaceable cam element (12a, 12b), the control unit (10a, 10b) for monitoring the switching unit (11a, 11h) taking into account at least one characteristic value for a voltage integral (14a, 14b) over a voltage (31a, 31b) which is induced in a the coil (21a, 21b) of the switching unit (11a, 11b) during the switching operation by a disengagement of the switching element (18a) from the axially displaceable cam element (12a, 12b) and to set its value with respect to a characteristic limit value stored in the control unit (10a, 10b).

2. The valve train device according to claim 1, wherein the control unit (10a) is adapted to add at least two voltage values separated by time for forming the characteristic value.

3. The valve train device according to claim 1, wherein the control unit (10a, 10b) is provided to monitor a retraction switching operation.

4. The valve train device according to claim 1, wherein the control unit (10a) is provided in at least one operating mode for a time-dependent determination of the characteristic value.

5. The valve train device according to claim 1, wherein, in at least one operating mode, the control unit (10a) is adapted to provide for an angle-dependent determination of the characteristic value.

6. The valve train device according to claim 1, wherein the control unit (10a, 10b) is provided for the evaluation of a defined interval.

7. The valve train device according to claim 6, wherein the interval has a time-dependent interval length.

8. The valve train device according to claim 6, wherein the interval has an angle-dependent interval length.

9. The valve train device according to claim 1, wherein the control unit (10a, 10b) is provided for setting the characteristic value with respect to a characteristic limit value which is independent of a switching speed.

10. The valve train device according to claim 1, wherein the control unit (10b) comprises at least one integrator circuit (34b).

11. A method for operating a valve train device of an internal combustion engine, the method comprising the steps of monitoring a switching operation of a switching unit (11a, 11b) comprising an actuator (17a, 17b) with a solenoid unit (20*a*, 20*b*) including a coil (21*a*, 21*b*) and a switching element (18*a*) for switching an axially displaceable cam element (12*a*, 12*b*) by engagement with a shift gate (13*a*, 13*b*) formed in the axially displaceable cam element (12*a*, 12*b*), wherein for monitoring the switching unit (11*a*, 11*b*) at least one characteristic value for a voltage integral (14*a*, 14*b*) across a voltage (31*a*, 31*b*) which is induced in the coil (21*a*, 21*b*) of the switching unit (11*a*, 11*b*) upon disengagement of the switching element (18*a*) at the end of the switching operation is taken into account and compared with respect to a characteristic limit value stored in the control unit (10*a*, 10*b*).

\* \* \* \* \*